// Patented Sept. 29, 1953

UNITED STATES PATENT OFFICE 2,653,945

PYRAN DERIVATIVES

Fritz Kögl, Utrecht, and Cornelis August Salemink, Amersfoort, Netherlands, assignors to Hoffmann-La Roche Inc., Nutley, N. J., a corporation of New Jersey No Drawing. Application May 1, 1952, Serial No. 285,548. In Switzerland May 29, 1951

6 Claims. (Cl. 260—343.5)

The present invention relates to compounds of the general formula

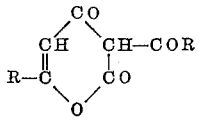

wherein R represents a singly or multiply branched, saturated or unsaturated aliphatic hydrocarbon radical with more than 5 carbon atoms, showing in warm-blooded animals good bactericidal activity with minimal toxicity.

According to the present invention, the new compounds can be manufactured by heating homologous aceto acetic esters of the general formula

wherein R has the above indicated meaning and R' represents a lower alkyl radical, in the presence of a catalyst of basic reaction to a temperature of 180–220° C. and distilling off the alcohol formed during the reaction.

The reaction may be illustrated by the following formulae:

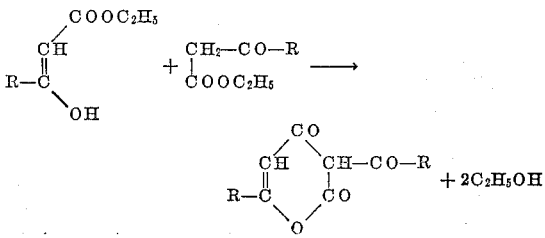

The condensation of the aceto acetic ester homologues is suitably effected by heating in the presence of a catalyst of alkaline reaction, sodium hydrogen carbonate being particularly suitable.

The novel compounds obtained according to the present invention are capable of strongly inhibiting the growth of different microorganisms in vitro and also prove to have antibacterial activity in vivo in the case of different infections; they are therefore employable as preserving agents and medicinals.

Example 1

α-Methyl-capronyl chloride (23.7 g.) obtained from the corresponding acid after a three hours' boiling with phosphorus trichloride is added, while cooling with ice, to sodium aceto acetic ester (77.2 g.) in benzene (300 cc.). The reaction mixture is heated for 15 minutes on a water-bath. It is then cooled and poured on ice and dilute sulfuric acid is added until Congo-acid reaction is reached. 100 cc. of ethanol are added and the benzene layer is separated, washed and dried with anhydrous sodium sulfate. The dry benzene layer is concentrated under reduced pressure of about 12 mm. Hg, and the remaining residue is treated with a solution of 6.6 g. of sodium in 190 cc. of absolute methanol. The mixture is allowed to stand for 18 hours, then poured onto ice and 10 per cent. sulfuric acid is added until the mixture is acid to Congo paper. It is then extracted with ether and, after evaporation of the ether in vacuo, the ethereal extract is fractionated. A colorless oil of boiling point 12 mm. Hg 112–113° C. is obtained. The yield in (α-methyl-capronyl)-acetic acid methyl ester amounts to 50 per cent. of the theoretical.

56 g. of (α-methyl-capronyl)-acetic acid methyl ester thus prepared are heated for 8 hours with 0.050 g. of sodium hydrogen carbonate to 200–215° C., whereby 10 cc. of methanol distill off. The reaction product is then fractionated under a pressure of 0.4 mm. Hg; the 3-(α-methyl-capronyl)-6-(α-methyl-pentyl)-2,3-dihydropyran-2,4-dione distills at 165–167° C. as an orange-yellow oil. The yield amounts to 35 per cent. of the theoretical. The reaction product is a mixture of the stereoisomers.

Example 2

(β-Methyl-capronyl)-acetic acid methyl ester is prepared from β-methyl-caproic acid according to the same method as indicated in Example 1 for the manufacture of (α-methyl-capronyl)-acetic acid methyl ester. It is a colorless oil of boiling point 12 mm. Hg 121–123° C. The yield amounts to 35 per cent. of the theoretical.

14 g. of (β-methyl-capronyl)-acetic acid methyl ester are heated for 4 hours with 0.03 g. of sodium hydrogen carbonate to 200–210° C., whereby 2.5 cc. of methanol distill off. After a first running essentially consisting of (β-methyl-capronyl)-acetic acid methyl ester, the fractionated distillation furnishes a yellow oil of boiling point 0.3 mm. Hg 160–162° C. The yield amounts to 30 per cent. of the theoretical; the 3-(β-methyl-capronyl)-6-(β-methyl-pentyl)-2,3-dihydropyran-2,4-dione obtained is a mixture of both stereoisomers.

Example 3

17 parts by weight of the acid chloride obtained from the (β,δ-dimethyl-capronyl)-acetic acid by boiling for 3 hours with phosphorus trichloride are added dropwise, while cooling with ice, to 60 parts by weight of sodium aceto acetic ester in 270 parts by volume of benzene. The mixture is heated for 15 minutes on a steam-bath, cooled down and poured on ice containing 5 per cent. sulfuric acid; the ice-water shall thereby show Congo-acid reaction. 100 parts by volume of ethyl alcohol are added, the benzene layer is separated, washed with water and dried with sodium sulfate. The benzene is evaporated in the vacuo of the water-jet pump and a solution of 6 parts by weight of sodium in 190 parts by weight of absolute methanol is added to the remaining residue. After standing for 18 hours at room temperature, the mixture is poured on ice and set acid to Congo-paper by adding dilute sulfuric acid. The oil is extracted with ether and the ethereal layer is fractionated in vacuo, whereby the ($\beta,\delta$-dimethyl-capronyl)-acetic acid methyl ester boils at 117–119° C. under a pressure of 12 mm. Hg.

14 parts by weight of ($\beta,\delta$-dimethyl-capronyl)-acetic acid methyl ester are heated for 6 hours with 0.05 part by weight of sodium bicarbonate to 200–210° C., whereby 2 parts by volume of methanol distill off. The reaction mixture is distilled under a pressure of 0.05 mm. Hg. After a small first running of ($\beta,\delta$-dimethyl-capronyl)-acetic acid methyl ester, the 3-($\beta,\delta$-dimethyl-capronyl)-6-($\beta,\delta$-dimethyl-pentyl)-2,3-dihydropyran-2,4-dione boils over at 144–147° C.

Example 4

34.5 parts by weight of ($\delta$-methyl-capronyl)-acetic acid methyl ester, prepared by the action of $\delta$-methyl-capronyl chloride on sodio aceto acetic ester, as extensively described in Example 3 for ($\beta,\delta$-dimethyl-capronyl)-acetic acid methyl ester, are heated for 8 hours to 200–210° C. with 0.05 part by weight of sodium bicrabonate, whereby 7 parts by volume of methanol distill off. When distilling under a pressure of 0.08 mm. Hg, the reaction product furnishes 3-($\delta$-methyl-capronyl)-6-($\delta$-methyl-pentyl)-2,3-dihydropyran-2,4-dione boiling at 153–154° C.

Example 5

($\alpha,\delta$-Dimethyl-capronyl)-acetic acid methyl ester is prepared, in a manner analogous to the one described in Example 3 for the preparation of ($\beta,\delta$-dimethyl-capronyl)-acetic acid methyl ester. The $\beta$-keto acid ester boils at 122–124° C. under a pressure of 15 mm. Hg.

24 parts by weight of ($\alpha,\delta$-dimethyl-capronyl)-acetic acid methyl ester are heated for 10 hours with 0.05 part by weight of sodium hydrogen carbonate to 210–230° C., whereby 2.5 parts by volume of methanol distill off. When distilling the reaction mixture in high vacuo, a yellow viscous oil of boiling point 0.31 mm. Hg 146–147° C. is obtained which represents pure 3-($\alpha,\delta$-dimethyl-capronyl)-6-($\alpha,\delta$-dimethyl-pentyl)-2,3-dihydropyran-2,4-dione.

Example 6

$\alpha,\gamma$-Dimethyl-valeric acid (M. W. Burrows and W. H. Bentley, Journal of the Chemical Society, London, vol. 67, year 1895, page 511) is converted in a manner known per se into the corresponding acid chloride, and the latter is reacted with sodium aceto acetic acid methyl ester to form $\alpha,\gamma$-dimethyl-valeryl-aceto acetic acid methyl ester. When cleaving the latter with aqueous ammonia ($\alpha,\gamma$-dimethyl-valeryl)-acetic acid methyl ester of boiling point 10 mm. Hg 100–110° C. is obtained.

28 parts by weight of ($\alpha,\gamma$-dimethyl-valeryl)-acetic acid methyl ester are heated for 6 hours with 0.05 part by weight of sodium hydrogen carbonate to 210° C.; the resulting methyl alcohol is distilled off during the reaction. The reaction product is fractionated in vacuo. The 3-($\alpha,\gamma$-dimethyl-valeryl)-6-($\alpha,\gamma$-dimethyl-butyl)-2,3-dihydropyran-2,4-dione is an orange-yellow oil of boiling point 0.1 mm. Hg 130–135° C.

Example 7

$\beta$-Ethyl-caproic acid (P. A. Levene et al., Journal of Biological Chemistry, vol. 91, year 1931, page 687, and vol. 115, year 1936, page 401) are converted in a known manner by way of ($\beta$-ethyl-capronyl)-aceto acetic acid methyl ester into ($\beta$-ethyl-capronyl)-acetic acid methyl ester boiling at 124–126° C. under a pressure of 14 mm. Hg.

30 parts by weight of ($\beta$-ethyl-capronyl)-acetic acid methyl ester are heated for 6 hours with 0.05 part by weight of sodium hydrogen carbonate to 210° C. and the methyl alcohol formed during the reaction is continuously distilled off. The residue is distilled in vacuo, whereby the 3-($\beta$-ethyl-capronyl)-6-($\beta$-ethyl-pentyl)-2,3-dihydropyran-2,4-dione is obtained as an orange-yellow oil of boiling point 0.05 mm. Hg 120° C.

Example 8

400 parts by weight of malonic acid diethyl ester are added at a temperature of 80° C., while stirring, to a solution of 57.5 parts by weight of sodium in 1,350 parts by volume of absolute butanol and 380 parts by weight of 2-bromo-2-methyl-butane (Organic Syntheses, vol. 13, year 1933, page 20) are then added dropwise at 85° C., whereby the reaction mixture is kept boiling gently. Finally, the mixture is further heated for half an hour to 85° C., a solution of 400 parts by weight of caustic potash in 400 parts by volume of water is added, and the mixture is refluxed for 5 hours. The butanol is then blown off with water-steam and the residue is refluxed for 60 minutes with 750 parts by volume of concentrated hydrochloric acid. The $\beta,\beta$-dimethyl-valeric acid is taken up in ether, dried with sodium sulfate and, after driving off the ether, fractionated in vacuo. Under a pressure of 14 mm. Hg the acid distills at 95–97° C. as a colorless oil and is converted into the ($\beta,\beta$-dimethyl-valeryl)-acetic acid methyl ester of boiling point 10 mm. Hg 102–104° C. in the same way as described in Example 6 for the $\alpha,\gamma$-dimethyl-valeric acid. ($\beta,\beta$-Dimethyl-valeryl)-acetic acid methyl ester is condensed, under the conditions set forth in Example 6, to 3-($\beta,\beta$-dimethyl-valeryl)-6-($\beta,\beta$-dimethyl-butyl)-2,3-dihydropyran-2,4-dione being a light-yellow oil of boiling point 0.1 mm. Hg 142–144° C.

Example 9

In a manner similar to the one specifically described in the preceding examples for the respective compounds, one may obtain from $\beta$-propyl-caproic acid (G. A. R. Kon and C. J. May, Journal of the Chemical Society, London, year 1927, page 1554) first $\beta$-propyl-capronyl-acetic acid methyl ester as a colorless oil of boiling point 12 mm. Hg 133–137° C. and therefrom 3-($\beta$-propyl-capronyl)-6-($\beta$-propyl-pentyl)-2,3-dihydropyran-2,4-dione in the form of an orange-yellow oil of boiling point 0.02 mm. Hg 175° C.

Example 10

Phytyl acetic acid is obtained by reacting phytyl bromide with sodium malonic ester in butanol and saponifying and decarboxylizing the phytyl malonic ester formed. The acid is a light-yellow oil of boiling point 0.09 mm. Hg 165–173°

C. It is converted with thionyl chloride into the acid chloride, the latter is reacted with sodium-aceto acetic acid methyl ester, and the reaction product is split with alcoholic ammonia so as to obtain phytyl acetylacetic ester.

10 parts by weight of phytyl acetyl-acetic ester are heated for 6 hours with 0.05 part by weight of sodium hydrogen carbonate to 210° C. The air in the reaction vessel is suitably removed by an inert gas, for instance nitrogen, in order to avoid oxydation and resinification of the reaction product. When distilling fractionally, the dihydropyran derivative of the formula

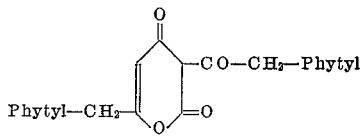

boils over as a red oil under 0.07 mm. Hg at 260–265° C.

*Example 11*

α-Ethyl-caproic acid chloride (Bulletin de la Société Chimique de France, vol. (4) 33, year 1923, page 186) is condensed with sodium aceto acetic acid ethyl ester and the (α-ethyl-capronyl)-aceto acetic acid ethyl ester obtained is split with simultaneous interchange of ester radicals by means of methanolic sodium methylate to form (α-ethyl-capronyl)-acetic acid methyl ester. Boiling point 16 mm. Hg 123–125° C.

100 parts by weight of (α-ethyl-capronyl)-acetic acid methyl ester and 0.1 part by weight of sodium hydrogen carbonate are heated for 3 hours to 210–215° C., whereby some methanol distills off. The 3-(α-ethyl-capronyl)-6-(α-ethyl-pentyl)-2,3-dihydropyran-2,4-dione of boiling point 0.03 mm. Hg 151–153° C. is isolated from the reaction mixture by fractionated distillation.

We claim:

1. Compounds of the general formula

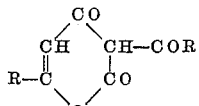

wherein R is selected from the group consisting of singly and multiply branched, saturated and unsaturated aliphatic hydrocarbon radicals with more than 5 carbon atoms.

2. As a new compound 3-(δ-methyl-capronyl)-6-(β-methylpentyl)-2,3-dihydropyran - 2,4 - dione.

3. As a new compound 3-(α,γ-dimethyl-valeryl)-6-(α,γ-dimethyl-butyl) - 2,3 - dihydropyran-2,4-dione.

4. As a new compound 3-(β-ethyl-capronyl)-6-(β-ethyl-pentyl)-2,3-dihydropyran-2,4-dione.

5. As a new compound 3-(β,β-dimethyl-valeryl)-6-(β,β-dimethyl-butyl) - 2,3 - dihydropyran-2,4-dione.

6. As a new compound 3 - (phytylacetyl) - 6-(phytylmethyl)-2,3-dihydropyran-2,4-dione.

FRITZ KÖGL.
CORNELIS AUGUST SALEMINK.

References Cited in the file of this patent

Spencer et al.: "Dehydroacetic Acid," Jour. of Pharm. and Exp. Ther., May 1950, pp. 57–111.
Arndt et al.: Berichte 57, 1489 (1924).
Arndt et al.: Berichte 69, 2373 (1936).
Feist: Ann. 257, 253 (1890).